United States Patent

[11] 3,536,258

| | | |
|---|---|---|
| [72] | Inventor | Antoni A. Rocheleau<br>Columbus, Ohio |
| [21] | Appl. No. | 673,446 |
| [22] | Filed | Oct. 6, 1967 |
| [45] | Patented | Oct. 27, 1970 |
| [73] | Assignee | Industrial Nucleonics Corporation<br>a corporation of Ohio |

[54] MOISTURE MEASURING APPARATUS
12 Claims, 4 Drawing Figs.

[52] U.S. Cl. ..................................... 235/151.3,
73/73, 162/252
[51] Int. Cl. ..................................... G01n 5/02,
G01n 25/56
[50] Field of Search.......................... 250/83.30;
235/151.3, 151.35; 73/73, 75; 162/252

[56] References Cited
UNITED STATES PATENTS

| 2,922,475 | /1960 | Alexander................... | 162/252 |
| 3,073,153 | /1963 | Petitjean..................... | 73/73 |
| 3,216,241 | /1965 | Hansen........................ | 73/75 |
| 3,244,206 | /1966 | Bossen........................ | 73/73X |

Primary Examiner—Eugene G. Botz
Assistant Examiner—Edward J. Wise
Attorney—Cushman, Darby and Cushman, and C. Henry Peterson, William T. Fryer III and James J. O'Reilly ABSTRACT: The following specification discloses apparatus for the indirect determination of the wet end moisture weight per unit area of a moving web which is subjected to a moisture removal operation comprising a basis weight gauge located at both the wet and dry ends of the moving web, a moisture gauge located at the dry end of the moving web for determining the percent moisture content thereat and a multiplier circuit for combining the signals from the dry end basis weight gauge and moisture gauge to derive a signal proportional to the moisture weight per unit area at the dry end of the moving web. A summing circuit is provided to add the signals from the wet end basis weight gauge and the multiplier circuit and to subtract from this sum the signal from the dry end basis weight gauge to generate a signal indicative of the moisture weight per unit area at the wet end of the moving web.

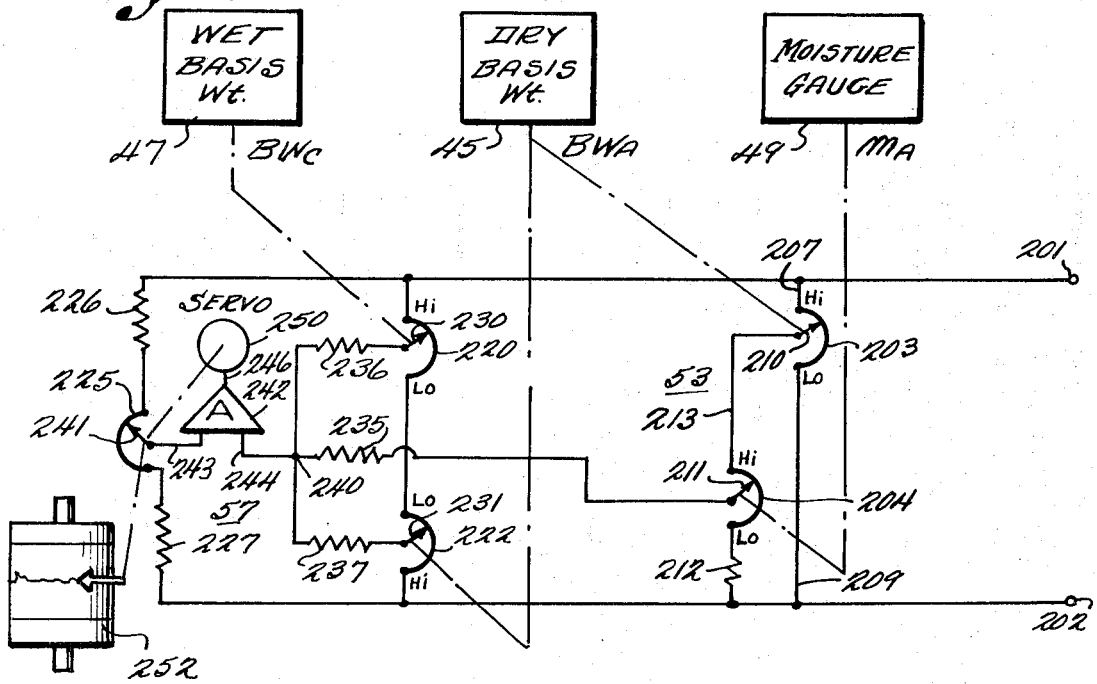
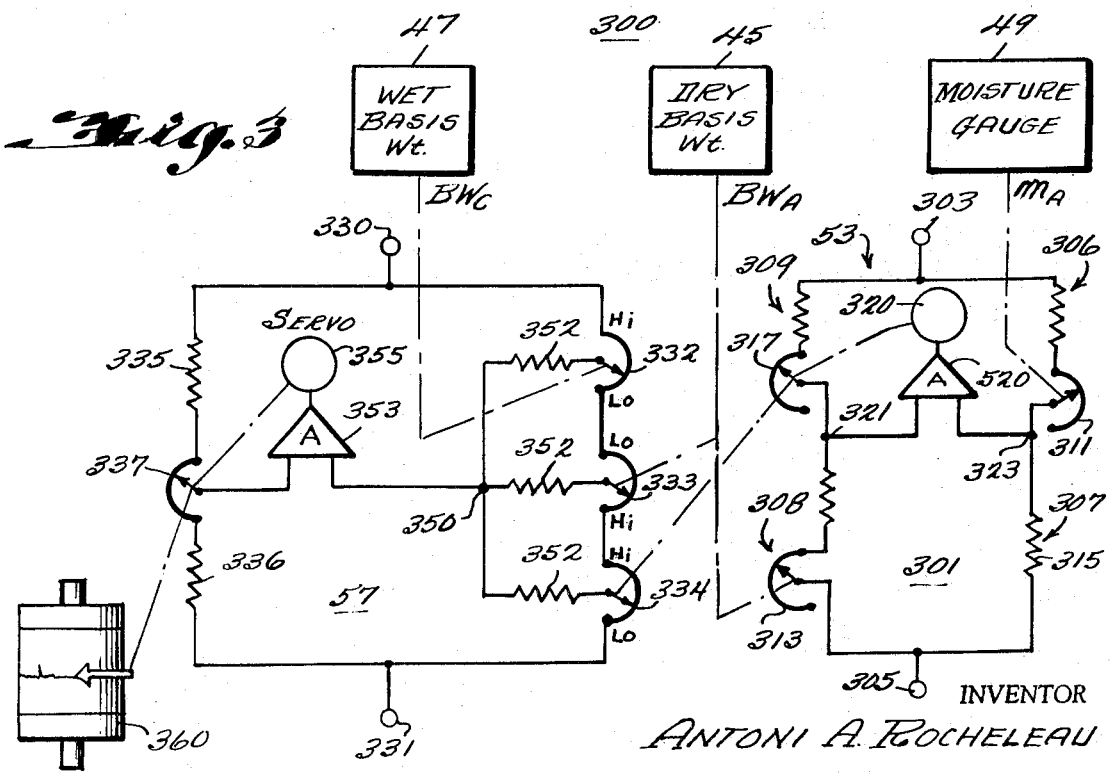

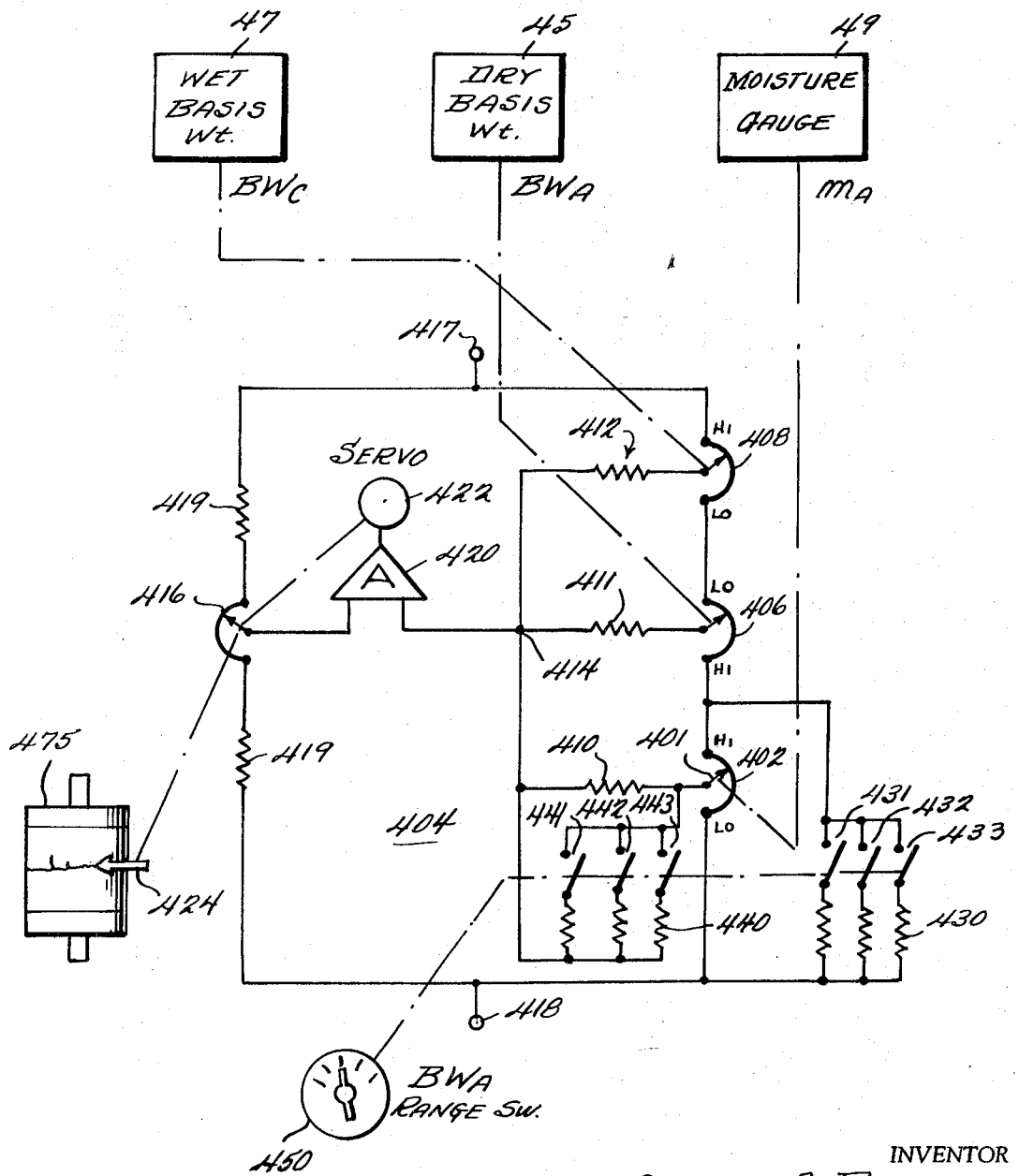

MOISTURE MEASURING APPARATUS

The present invention relates to process monitoring and control apparatus for paper making machines and more specifically, concerns the monitoring and control of the moisture present in the paper at the wet end of the paper making machine.

In the Fourdrinier paper making process, as well as other methods of paper manufacture, it is desirable and often necessary to determine the amount of moisture present at the wet end. For the purposes of definition, the term "wet end" as used herein refers to any point of the paper making process at which the amount of moisture is too high to be directly measured with sufficient accuracy by conventional apparatus. More specifically, and with respect to the Fourdrinier paper making process, the "wet end " refers to that portion of the paper making process at a point downstream from the Fourdrinier section and upstream from the point whereat the paper is passed through the drier sections. In general, the "dry end" refers to that portion of the paper making process when the paper has been dried, i.e., water removed to some low level, although the paper is not completely without moisture, as the term might imply.

In the Fourdrinier paper making process, it has been found that in the area of the presses which follow the Fourdrinier section, the fiber bonding process, which is an all-important phenomenon, begins and that its extent is strongly affected by the moisture present in the sheet at that point.

It has further been found that due to the high amount of moisture present in the paper in the vicinity of the press section, the amount of moisture weight cannot be directly and accurately measured by known apparatus.

U.S. Pat. No. 3,260,642 issued on July 12, 1966 to W. H. Canter discloses the basic apparatus and method for determining wet end moisture content which comprises determining the basis weight at the wet end, determining the basis weight at the dry end, determining the moisture content at the dry end and combining these measurements in a computer to determine the moisture content at the wet end. In one embodiment the computer utilizes the relationship expressed by the following formula:

$$M = \frac{W - D\left(1 - \frac{c}{100}\right)}{W}$$

where "M" is the wet end moisture content, "W" is the wet end basis weight, "D" is the dry end basis weight and "c" is the percent moisture at the dry end.

It has also been suggested that wet end moisture content, in terms of pounds moisture per pounds fiber, can be determined with considerable accuracy by measuring the mass flow rate of the paper web at the wet and dry ends and combining these measurements along with the percent moisture content at the dry end in a computer. In one embodiment, the computer utilizes the relationship expressed by the equation:

$$M = \frac{MF_C - MF_A\left(1 - \frac{c}{100}\right)}{MF_A\left(1 - \frac{c}{100}\right)}$$

where "M" is the moisture content at the wet end expressed in units of pounds of water per pound of fiber, "$mf_C$" is the mass flow rate of the material at the wet end, "$MF_A$" is the mass flow rate of the material at the dry end and "c" is the percent moisture content of the web at the dry end.

Wet end moisture content determination in terms of either percent moisture or pounds moisture per pounds fiber is extremely reliable and quite useful in the control of the process as well as being a meaningful indication of the operation of the paper making apparatus. It has been found, however, that in certain applications, such as drier control, the moisture weight per unit area of the moving web is a more meaningful parameter and provides a more realistic basis from which the drier operation may be evaluated both as to overall efficiency and the cross-sheet drying operation. By determining the moisture weight per unit area with cross-sheet scanning gauges, the standard moisture profile, in terms of weight per unit area, enables reliable determination of the operation of the drier apparatus in all sectors. The moisture weight per unit area indication is also much more desirable from the standpoint of the machine operator to whom the moisture content in terms of percent of weight or as a ratio of water to fiber, is a relatively abstract quantity. The operator can much better evaluate and appreciate wet end moisture profile variation when it is associated with the commonly established and well understood values such as pounds per ream which are used to express basis weight and its cross-machine profile variation.

The present invention provides apparatus for determining the moisture weight per unit area at the wet end of the paper making process. In accordance with the invention, this determination is effected by monitoring the basis weight per unit area of the web at the wet end, the basis weight per unit area of the web at the dry end, determining the moisture weight per unit area at the dry end and combining these quantities in accordance with the equation $$M_C = BW_C - BW_A + M_A$$

wherein "$M_C$" and "$M_A$" represent the moisture weight per unit area at the wet and dry ends respectively and "$BW_C$" and "$BW_A$" represent the basis weight at the wet and dry ends, respectively, in terms of weight per unit area. For the purpose of definition, the term "basis weight" as used herein is understood to refer to the weight of the moving web including both the fiber weight and the moisture weight.

Briefly, the apparatus according to the instant invention, comprises a pair of cross-sheet scanning beta ray gauges for determining the basis weight and a conventional percent moisture gauge such as well known dielectric sensitive gauges. Each of the gauges contains suitable internal circuitry for providing the required indication of the parameter being monitored.

One of the basis weight gauges is located at the wet end and the other basis weight gauge and the moisture gauge are located at the dry end of the web being processed. The signal proportional to the moisture weight per unit area at the dry end is obtained by multiplying the signals from the dry end basis weight gauge and the percent moisture gauge in a multiplier circuit. The three signals thus obtained, i.e., the signals representing the wet end basis weight ($BW_C$), the dry end basis weight ($BW_A$), each expressed in terms of weight per unit area, and the moisture weight per unit area at the dry end ($M_A$) are then combined in an adder circuit in accordance with the expression $$BW_C - BW_A + M_A$$

whereby the output of the adder circuit is proportional to the moisture weight per unit area at the wet end. The present invention further contemplates the use of the percent moisture signal as an approximation of the moisture weight per unit area at the dry end whereby the multiplication step can be eliminated.

The present invention may be better understood by reference to the following detailed description thereof in conjunction with the attached drawings in which:

FIG. 2 is a circuit diagram of the preferred embodiment of the adder and multiplier elements shown in FIG. 1;

FIG. 3 is a circuit diagram of another embodiment of the adder and multiplier circuits; and FIG. 4 is a circuit diagram of yet another embodiment of the solution circuitry.

Figure 1:
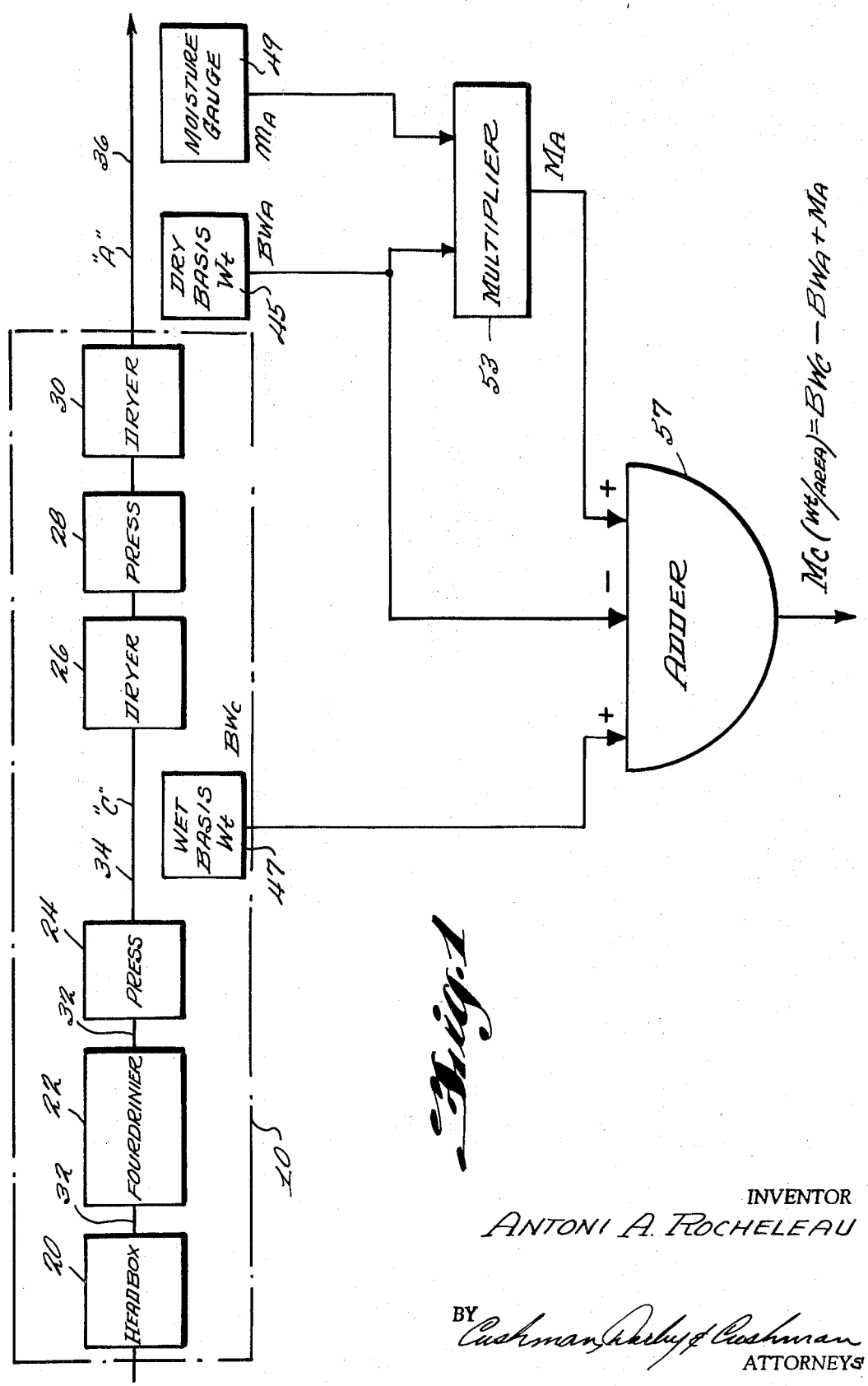
FIG. 1 is a block diagram of a preferred embodiment of the present invention as used in a Fourdrinier paper making process.

Enclosed within dotted line 10 in FIG. 1 there is schematically illustrated the various elements employed in a conventional Fourdrinier paper making process including headbox 20, a Fourdrinier wire section 22, press section 24, drier section 26, another press section 28 and a final drier section 30. Paper stock supplied to headbox 20 is formed by the Fourdrinier section 22 into a mat schematically illustrated at 32. In other types of paper making machines, other means may be employed to form the mat 32. Water which clings to the mat 32 is extracted at the press section 24. The damp sheet 34 issuing from the press section is subsequently dried in steam drier 26. It may be sized, and again pressed, in press section 28 and again dried in drier 30. The sheet 36, leaving the drier section 30, is the finally prepared paper which may be subsequently passed thorough other processing steps such as sizing, coating and the like.

Due to the nature of the paper making process, the critical amount of moisture present at point "C" of sheet 34 is quite high and cannot be directly measured with sufficient accuracy and reliability by known techniques. However, the final moisture present at the dry end, i.e., point "A" of sheet 36, is quite low and can be directly measured with high accuracy by known techniques, and then used to indirectly determine the amount of moisture at the wet end.

The apparatus for determining the moisture weight per unit area of the web at point "C" comprises a dry end basis weight gauge 45 which is preferably a cross-sheet scanning beta ray gauge of well known construction and wet end basis weight gauge 47 which is also preferably a cross-sheet scanning beta ray gauge. Both of these gauges contain well known internal circuitry (not shown) to render the output signal thereof proportional to the weight or mass per unit area of the traveling web which includes both the weight of the moisture and the fiber.

At the dry end (A), which could also be located at the output of drier 26, there is also provided a moisture measuring gauge 49 of well known construction which develops an output signal which is indicative of the percent moisture present in the traveling web at the dry end. The dry end basis weight gauge, the wet end basis weight gauge and the moisture gauge are preferably interconnected in a well known manner in order to permit the synchronous scanning of the sheet by each of the gauges.

The output of the moisture gauge 49 and the dry end basis weight gauge 45 are connected to a multiplier circuit 53. The output signal from the multiplier circuit 53 is therefore representative of the product of the percent moisture and the dry end basis weight and consequently, is equal to the moisture weight per unit area.

The output from the wet end basis weight gauge 47, which represents the weight per unit area of the sheet at point "C", is connected to a summing circuit, generally indicated at 57. The output of multiplier 53 is similarly connected to the summing circuit 57. The output of the dry end basis weight gauge is also connected to the summing circuit 57 in such a manner (to be explained hereinafter) as to be reversed in phase so that this signal will be subtracted from the sum of the signals from the wet end basis weight gauge and multiplier circuit 57.

In this manner the output of the summing circuit 57 will be the indication of the moisture weight per unit area $M_C$ at point "C" since the summing circuit is effective to combine the various input signals in accordance with the following equation $$M_C = BW_C - BW_A + M_A$$

where "$M_C$" as represented by the output of the summing circuit is the moisture weight per unit area at point "C", "$BW_C$" and "$BW_A$" represent the basis weight of the sheet in terms of weight per unit area at their respective locations as determined by gauges 45 and 47 and "$M_A$" as represented by the signal from multiplier circuit 53 is the moisture weight per unit area at point "A".

In FIG. 2 there is shown a schematic diagram of the preferred embodiment of the multiplier and summing circuits which are illustrated in block diagram form in FIG. 1. The wet end basis weight gauge 47, dry end basis weight gauge 45 and the moisture gauge 49 are generally indicated at 200. Each of these gauges are of the null-balance type wherein the position of the wiper contact of a potentiometer, which is driven by a suitable servomechanism is indicative of the parameter being monitored by the gauge.

The multiplier circuit, generally indicated at 53, and the summing circuit generally indicated at 57, are both adapted to be supplied from a source of DC potential (not shown) which is adapted to be connected to input terminals 201 and 202. The multiplier circuit comprises a pair of linear potentiometers 203 and 204. Potentiometer 203 is connected across terminals 201 and 202 by leads 207 and 209 and potentiometer 204 is connected between the wiper contact 210 of potentiometer 203 and terminal 202 by resistor 212 and lead 213. The resistor 212 is included in series with the potentiometer 204 to prevent a zero moisture indication when the wiper contact 211 is at the lowest position. This compensation is required due to the fact that the moisture present in the sheet at the dry end never reaches zero and that in most moisture gauges the scale does not extend to zero at the low end.

The The wiper contact 210 of potentiometer 203 is shown as being mechanically ganged with the servo (not shown) located in the dry end basis weight gauge 45 and the wiper contact 211 of potentiometer 204 is similarly illustrated as being mechanically driven by the servomechanism in the moisture gauge 49. The mechanical connection between both these wiper contacts is such that for increasing values of basis weight and moisture content, the wiper contacts are caused to be driven in a counterclockwise direction as indicated by the high-low legend illustrated on each of these potentiometers. By well known circuit analysis techniques, it will be seen that the voltage appearing at the wiper contact of potentiometer 204 will be proportional to the product of the basis weight as measured by gauge 45 and the percent moisture as measured by the gauge 49 and consequently will be indicative of the moisture weight per unit area at the dry end (A) of the paper making operation.

The summing circuit, generally indicated at 57, comprises a wet end basis weight potentiometer 220 and a dry end basis weight potentiometer 222 connected in series between terminals 201 and 202. A solution potentiometer 225 is also included in the summing circuit and is connected between terminals 201 and 202 through current limiting resistors 226 and 227.

The wiper contact 230 of wet end basis weight potentiometer 220 is mechanically ganged with the wet end basis weight gauge servo and the wiper contact 231 is mechanically ganged with the dry end basis weight gauge servo. The wiper contacts 211, 230 and 231 are connected through summing resistors 235, 236 and 237, respectively to a common node 240.

Amplifier 242 is connected between common node 240 and the wiper contact 241 of the solution potentiometer 225 via leads 243 and 244. The output of amplifier 242 is connected via lead 246 to a servomotor 250 such that the servomotor is effective to drive the wiper contact 241 in such a direction as to reduce any voltage difference between the wiper contact and the common node 240 to zero. The servomotor is also mechanically ganged with the pen of a strip chart recorder 252.

As previously pointed out, the voltage existing at the wiper contact 211 is directly proportional to the moisture weight per unit area $M_A$ at the dry end of the paper making operation. The mechanical connection between the wet end basis weight gauge servo and wiper contact 230 renders the voltage at wiper contact 230 directly proportional to the wet end basis weight, $BW_C$, and by referring to the legend provided on potentiometer 222, it can be seen that the voltage at wiper contact 231 is inversely proportional to the dry end basis weight. In other words, as the basis weight at the dry end increases, the voltage at wiper contact 231 will decrease. This inverse proportionality characteristic is achieved simply by proper connection of the leads to potentiometer 222.

By well known circuit analysis techniques, it can be shown that the voltage at node 240 is a linear function of the sum of voltages at wiper contacts 211, 230 and 231. As a result, and by virtue of the phase reversal of the drive for wiper contact 231, it can be seen that the voltage existing at common node 240 is directly proportional to the expression $$BW_C - BW_A + M_A$$

which, as previously indicated, is equal to the moisture weight per unit area of the web at the wet end.

The null-balance function of the amplifier 242 and servo 250 is effective to maintain the voltage at wiper contact 241 equal to the voltage appearing at common node 240 and therefore the shaft position of the servomotor and consequently the displacement of the pen in recorder 252 is directly proportional to the moisture weight per unit area of the web at the wet end of the paper making operation. Thus a real time, or instantaneous indication of the moisture weight per unit area at point "C", the wet end, is made available for the purpose of manual control by an attendant or by suitable servo feedback mechanisms (not shown) to automatically regulate the process.

In FIG. 3 there is shown a schematic diagram of another embodiment of the solution circuitry in which a null-balance wheatstone bridge is employed as the multiplier component 57 shown in block diagram form in FIG. 1. The wet end basis weight gauge 47, dry end basis weight gauge 45 and the moisture gauge 49 are again generally indicated at 300.

Multiplier circuit 53 comprises a self-balancing wheatstone bridge 301. Bridge 301 is preferably energized by a suitable source of DC potential (not shown) connected to terminals 303 and 305. It should be understood, however, that AC energization is also possible. The bridge itself is comprised of four arms 306, 307, 308 and 309. Arm 306 is comprised of a mechanically variable rheostat 311 which is mechanically ganged to the moisture indicating potentiometer of the moisture gauge 49. Arm 308 is similarly comprised of a mechanically variable rheostat 313 which is mechanically ganged to the basis weight indicating potentiometer in the dry end basis weight gauge 45. Arm 307 is comprised of a fixed resistance 315 and arm 309 contains a balancing rheostat 317, the wiper contact of which is driven by servomotor 320, which is energized by a servo amplifier 520 connected between bridge terminals 321 and 323.

Summing circuit 57 operates on the same principle as the summing circuit shown in FIG. 2. Terminals 330 and 331 are adapted to be connected to a suitable source of DC potential (not shown). Potentiometers 332, 333 and 334 are connected in series between terminals 330 and 331. Current limiting resistors 335 and 336 and solution potentiometer 337 are also connected in series between terminals 330 and 331. The wiper contacts of potentiometers 332—334 are connected to a common node 350 by summing resistors 352. Amplifier 353 is connected between the wiper contact of potentiometer 337 and terminal 350, and the output of the amplifier is connected to servomotor 355 which is mechanically connected to the wiper contact of potentiometer 337.

The wiper contact of potentiometer 332 is mechanically ganged with the wiper contact of the output potentiometer of the wet end basis weight gauge and the wiper contact of potentiometer 333 is similarly mechanically connected to the wiper contact of the output potentiometer in the dry end basis weight gauge. The wiper contact of potentiometer 334 is ganged with the wiper contact of potentiometer 317 in the multiplier circuit 53.

The operation of the circuitry shown in FIG. 3 will now be explained. Servomotor 320 of the multiplier circuit 53 is energized whenever a potential difference exists between terminals 321 and 323 and will drive the wiper contact of potentiometer 317 in such a direction as to reduce the potential difference between terminals 321 and 323 to zero. In accordance with the well known wheatstone bridge solution, the impedance of arm 309 can be expressed in terms of the impedance of arms 306, 307 and 308 for the null condition by the following equation $$R309 = \frac{R306 \times R308}{R307}$$

where "R306—R309" represents the impedance of the respective arms of the bridge. Thus, it can be seen that since the impedance of arm 306 and arm 308 are directly proportional to the percent moisture ($m_A$) and basis weight ($BW_A$), respectively, of the sheet at point "A", the impedance and therefore the wiper position of potentiometer 309 is directly proportional to the product of these quantities and consequently the moisture weight per unit area $M_A$ of the sheet at point "A". By mechanically ganging potentiometer 334 with the drive for rheostat 317 the factor $M_A$ is entered in the summing circuit 57.

The summing circuit 57 operates in the same manner as the summing circuit of FIG. 2 described hereinbefore. The voltage at common node 350 is equal to the sum of the voltages appearing at wiper contacts of the potentiometers 332—334 and the servomotor 355 is effective to drive wiper contact of potentiometer 337 in such a direction as to maintain a null condition in the bridge.

As was explained with regard to FIG. 2 the drive of potentiometer 333 by the dry end basis weight gauge servo and the connection of the potentiometer leads are arranged so that the voltage at common node 350 actually represents the expression $$BW_C - BW_A + M_A$$

which expression is equal to the moisture weight per unit area at the wet end (C).

The shaft position of the servomotor 355 is therefore indicative of the moisture weight per unit area at the wet end and may be mechanically coupled to the pen of a recorder 360 to provide a visual output indication thereof. Feedback control can also be obtained in a well known manner.

In FIG. 4 there is shown a further embodiment of a solution circuit suitable for use in accordance with the teachings of the present invention. The circuit shown in FIG. 4 is considerably less complicated than the embodiments shown in FIGS. 2 and 3 and is of particular use in paper manufacturing operations wherein, for a given run, the moisture weight per unit area variations at the dry end are small and the fiber content is relatively constant.

In this situation, i.e., when basis weight variations are predominantly due to moisture changes and when these moisture changes are relatively small, the percent moisture indication provided by moisture gauge 49 can be employed as an approximation of the moisture weight per unit area of the material at the dry end without introducing significant errors. This is true in view of the fact that percent moisture is approximately directly proportional to moisture weight per unit area over a limited range.

In accordance with this assumption, the embodiment shown in FIG. 4 completely eliminates the multiplication circuitry 53 (FIGS. 1 to 3) and instead of this separate multiplication operation, the servomechanism in the percent moisture gauge 49 is directly connected to the wiper contact 401 of the moisture potentiometer 402 in the summation bridge 404.

The bridge 404 is substantially identical to the summation circuitry shown in FIGS. 1 to 3 and comprises a basis weight indicative potentiometer 406 which is mechanically ganged to the servomechanism in the dry end basis weight gauge 45 and a second basis weight indicative potentiometer 408, the wiper contact of which is driven by the wet end basis weight gauge 47. The wiper contacts of potentiometers 402, 406 and 408 are connected to the common node 414 via summing resistors 410, 411 and 412, respectively. The solution potentiometer or slide wire 416 is connected between the bridge terminals 417 and 418 through current limiting resistors 419. The amplifier 420 is connected between the summing node 414 and the wiper contact of solution potentiometer 416. The output of the amplifier is connected to the servomotor 422 which is mechanically connected to the wiper contact of potentiometer 416 to maintain the voltage difference appearing across the amplifier at null. The servo 422 is also adapted to drive the pen 424 of a strip chart recorder 425 to provide a record of the wet end moisture weight per unit area.

Assume that the average percent moisture for a given run and a given basis weight is approximately 8 percent. By choosing the proper impedance value for the potentiometer 402, the voltage at tap 401 can be set to exactly represent the moisture weight per unit area of the material for a given basis weight when the wiper contact indicates an 8 percent moisture level. Then, for small variations of the moisture level from the mean value of 8 percent, the voltage at the tap 401 will be a good approximation of the absolute moisture weight per unit area at the dry end. Of course, as the moisture variations from the average value increase, the accuracy of the system will decrease in view of the nonlinear relationship between the percent moisture and the actual moisture weight per unit area, however, for limited variations, this embodiment is quite accurate.

In actual practice, it has been found that for a given run of paper the amount of moisture is the only significant variable and therefore a fixed voltage drop across the potentiometer 402 is satisfactory.

It has further been found however, that the basis weight may vary considerably from one run of paper to another. If only a single setting for the voltage drop across potentiometer 402 is available, then, as the basis weight is decreased, for example, the voltage at the tap 401 would remain constant, since the percent moisture does not change appreciably, and thus indicates a higher moisture weight per unit area than is actually present.

In order to compensate for this error, the voltage across the potentiometer must be decreased as the basis weight is decreased.

To this end, the present invention provides the resistors 430 which are adapted to be connected in parallel with the potentiometer 402 by switches 431, 432 and 433. The switches are ganged with the range switch 450, associated with the dry end basis weight gauge. This range switch is effective to switch impedances into the null-balance circuitry in the dry end basis weight gauge to optimize its accuracy in each possible range of basis weights in a well known manner. The range switch 450 is mounted on the dry end basis weight gauge, but shown here at lower part of the drawing for the purpose of clarity.

The mechanical connection to the switches is such that as the basis weight decreases, the switches are cumulatively connected in parallel across potentiometer 402. At the maximum basis weight, no switches are closed and at the minimum basis weight, all the switches are closed whereby the voltage drop is at its minimum value. The value of these resistors is selected such that for each basis weight range the voltage at tap 401, for an 8 percent moisture level will be exactly equal to the moisture weight per unit area of the material at the dry end.

It has also been found that for each range of basis weight the slope of the curve defining the relationship between the percent moisture and moisture weight per unit area is different. More specifically, as the basis weight decreases, the slope of this relationship increases. Without compensation therefore, the range of moisture variation which could be accurately measured, would vary from run to run.

In order to prevent this degradation in accuracy range, the slope of the curve defining the relationship between the voltage appearing at tap 401 and the node 414 must be varied in accordance with the slope variations in the percent moisture versus moisture weight curve.

To this end, the present invention provides the resistors 440 which are adapted to be connected in parallel with summing resistor 410 through switches 441, 442 and 443 in the same manner as the resistors 430 are connected across the potentiometer 402.

By cumulatively connecting the resistors 440 across resistor 410, thus as the basis weight range decreases, the impedance of the parallel combination decreases and therefore, the rate of change of the voltage across the parallel combination increases. In other words, the slope of the curve, defining the relationship between the voltage at tap 401, and the voltage at node 414 attributable to the voltage at tap 401, increases to thereby significantly decrease the range degradation mentioned hereinbefore.

The cumulative connection is not necessary in the embodiment. The resistors may be graduated in resistance value so that the switches are closed one at a time. The graduation of the resistance values accomplishes the same effect as the cumulative connection.

As an alternate solution to this nonlinear problem, the potentiometer itself may be of the nonlinear type in which the impedance of the potentionmeter increases exponentially from one end to the other. By proper fabrication, the potentiometer can be made to exactly represent the curve of percent moisture versus absolute moisture content. The alternate solution therefore accurately converts percent moisture to actual moisture content, assuming that the fiber content does not vary.

In the event that the fiber content does vary, the compensation procedure mentioned above with regard to the voltage drop across the moisture indicative potentiometer may be employed.

Thus it can be seen that this embodiment of the present invention disclosed in FIG. 4 provides a simple solution circuitry which is capable of relatively accurate results over a considerable range in basis weight which would otherwise be unobtainable.

The foregoing description of the various solution circuits suitable for use in accordance with the teachings of the present invention is not intended to limit the scope thereof. On the contrary, it will be apparent to those of ordinary skill in the art that the various mechanical components and electrical circuitry disclosed are amenable to a variety of changes and modifications within the scope of the invention which is to be determined only by reference to the following claims.

It is understood also that various additions to the disclosed apparatus may be necessary or desirable according to the requirements of a specific paper making machine or other machine. For example, if significant longitudinal shrinkage or stretching of the sheet between points "C" and "A" occurs, suitable sheet speed sensors can be located at these points and the computations corrected in accordance with the speed ratio in a manner similar to that disclosed in the Canter patent, supra. Likewise if the sheet width changes between these points, correction can be made in accordance with the measured sheet width ratio in a manner similar to that described in my copending application Ser. No. 587,092, filed jointly with William E. Smith on Oct. 17, 1966 (and now abandoned) for "Consistency Measurement and Control System for Paper Making Machines". In many cases, the speed and width changes between the measuring points are found to be substantially mutually self-compensating, so that no correction of the computations is necessary. Where the effects of speed and width remain relatively constant, suitable constant calibration adjustments can be made to the computer, without requiring dynamic speed and width signal inputs to the computer from the sheet width and speed sensors. These and other elaborations as well as the various modifications readily apparent to one skilled in the art are likewise to be considered within the scope of the invention as is set forth in the appended claims.

I claim:

1. In an apparatus wherein a traveling material is subjected to a moisture removal operation in passing from a first station to a second station, means for generating a first signal indicative of the basis weight of said material passing said first station, means for generating a second signal indicative of the basis weight of said material passing said second station, means for generating a third signal at least approximately indicative of the moisture weight per unit area of the material passing said second station and summing means for adding said first and third signals and subtracting said second signal from the sum of said first and third signals, the output of said summing means thereby representing the moisture weight per unit area of said material passing said first station.

2. In an apparatus wherein a traveling material is subjected to a moisture removal operation in passing from a first station C to a second station A, means for generating a signal indicative of the basis weight $BW_C$ of said material passing said first station, means for generating a signal indicative of the basis weight $BW_o$f said material passing said second station, means for generating a signal at least approximately indicative of the moisture weight per unit area $M_A$ of the material passing said second station, and means responsive to said $BW_C$, $BW_A$ and $M_A$ indicative signals for forming the algebraic sum of said basis weights and moisture weight per unit area indicated thereby, said sum forming means effectively summing said $BW_C$ and $M_A$ with the same algebraic sign and said $BW_A$ with the opposite sign, for producing a further signal indicative of the value of $M_C$ in accordance with the relationship expressed by $$M_C = BW_C - BW_A + M_A$$

wherein "$M_C$" represents the moisture weight per unit area of said material passing said first station.

3. In an apparatus wherein a traveling material is subjected to a moisture removal operation in passing from a first station C to a second station A:
   means for generating a signal indicative of the basis weight $BW_C$ of said material passing said first station;
   means for generating a signal indicative of the basis weight $BW_A$ of said material passing said second station;
   means for generating a signal indicative of the percent moisture $m_A$ of said material passing said second station;
   means responsive to said $BW_A$ and $m_A$ indicative signals to generate a signal indicative of the multiplication product $(BW_A)(m_A)$ and hence indicative of the moisture weight per unit area $M_A$ of said material passing said second station; and
   means responsive to said $BW_C$, $BW_A$ and $M_A$ indicative signals for computing the algebraic sum of said basis weights and moisture weight per unit area indicated thereby, said computing means effectively summing said $BW_C$ and $M_A$ with the same sign and said $BW_A$ with the opposite sign to produce a further signal indicative of the value of $M_C$ in accordance with the relationship expressed by $$M_C = BW_C - BW_A + M_A$$

wherein $M_C$ represents the moisture weight per unit area of said material passing said first station.

4. The apparatus of claim 3 wherein said means for generating said signal indicative of said multiplication product comprises means for multiplying said $BW_A$ and $m_A$ signals, said multiplying means comprising:
   means responsive to one of said $BW_A$ and $m_A$ signals for generating a voltage proportional thereto;
   potentiometer means having a wiper contact;
   means for connecting said potentiometer across said voltage proportional to said one of said signals; and
   means for driving the wiper contact of said potentiometer in accordance with the other of said $BW_A$ and $m_A$ signals whereby the voltage appearing at said wiper contact is proportional to the product of said $BW_A$ and $m_A$ signals.

5. The apparatus of claim 3 wherein said means for generating said signal indicative of said multiplication product comprises means for multiplying said $BW_A$ and $m_A$ signals, said multiplying means comprising:
   a null-balance bridge having first, second, third and fourth terminals;
   said first and second terminals being adapted to be connected to a source of electrical energy;
   first variable resistance means connected between said first and third terminals;
   means for varying said first resistance means in accordance with said $BW_A$ signal;
   second variable resistance means connected between said second and fourth terminals;
   means for varying said second resistance means in accordance with said $m_A$ signal;
   resistor means connected between said second and third terminals;
   third variable resistance means connected between said first and fourth terminals; and
   a servomotor connected between said third and fourth terminals for varying said third variable resistance to maintain the bridge at null condition, the shaft position of said servomotor being proportional to the product of the $BW_A$ and $m_A$ signals.

6. The apparatus of claim 3 wherein said computing means comprises:
   means for generating a first voltage proportional to the $BW_C$ signal;
   means for generating a second voltage proportional to the $BW_A$ signal 180°;
   means for generating a third voltage proportional to the $M_A$ signal;
   means for adding said first, second and third voltages, the resulting voltage being indicative of the absolute moisture content of said material passing said first station.

7. The apparatus of claim 3 wherein said means for computing the value of $M_C$ comprises:
   first and second terminals adapted to be connected to a source of electrical energy;
   first and second potentiometer means connected in series between said first and second terminals;
   each of said first and second potentiometers having a wiper contact;
   means for driving the wiper contact of said first potentiometer in accordance with said $BW_C$ signal;
   means for driving the wiper contact of said second potentiometer in accordance with the the $BW_A$ signal 180°;
   a summing node;
   means for connecting the voltage appearing at the wiper contacts of said first and second potentiometers to said summing node;
   Means for connecting a voltage proportional to the $M_A$ signal to said summing node;
   a solution potentiometer connected between said first and second terminals, said solution potentiometers having a wiper contact;
   a servomotor connected between said summing node and the wiper contact of said solution potentiometer; and
   means for mechanically coupling the shaft of servomotor to the wiper contact of said solution potentiometer for maintaining the voltage across said servomotor at null, the shaft position of said servomotor thereby being indicative of the moisture weight per unit area of said material passing said first station.

8. The apparatus of claim 3 wherein said means for computing the value $M_C$ comprises:
   first and second terminals adapted to be connected to a source of electrical energy;
   first, second and third potentiometers connected in series between said first and second terminals, each of said potentiometers having a wiper contact;
   means for driving the wiper contact of said first potentiometer in accordance with said $BW_C$ signal;
   means for driving the wiper contact of said second potentiometer in accordance with the $BW_A$ signal 180°;
   Means for driving the wiper contact of said third potentiometer in accordance with the $M_A$ signal;
   a summing node;
   means for connecting the voltage appearing at the wiper contacts of said first, second and third potentiometers to said summing node;
   a solution potentiometer connected across said first and second terminals;
   said solution potentiometer having a wiper contact;
   a servomotor having an output shaft;
   means connecting said servomotor between said summing node and said wiper contact of said solution potentiometer; and means for coupling the shaft of said servomotor to the wiper contact of said solution potentiometer, said servomotor being effective in response to voltage difference thereacross to drive the wiper contact of said solution potentiometer in such a direction as to reduce said voltage difference to zero, the shaft position of said servo thereby being proportional to the moisture weight per unit area of said material passing said second station.

9. In an apparatus wherein a traveling material is subjected to a moisture removal operation in passing from a first station C to a second station A:

means for generating a $BW_C$ signal indicative of the basis weight of said material passing said first station;

means for generating a $BW_A$ signal indicative of the basis weight of said material passing said second station;

means for generating a $m_A$ signal indicative of the percent moisture content of said material passing said second station;

a solution circuit comprising first and second terminals adapted to be connected to a source of electrical energy; first, second and third potentiometers connected in series between said first and second terminals, each of said potentiometers having a wiper contact;

means for driving the wiper contact of said first potentiometer in accordance with the $BW_C$ signal;

means for driving the wiper contact of said second potentiometer in accordance with the $BW_A$ signal - 180°;

means for driving the wiper contact of said third potentiometer in accordance with the $m_A$ signal;

means for setting the voltage across said third potentiometer such that the voltage at the wiper contact thereof is approximately directly proportional to the moisture weight per unit area $M_A$ of said material passing said second station over a limited range;

means connecting the wiper contacts of said first, second and third potentiometers to a summing node whereby the voltage thereat is proportional to the quantity $BW_C - BW_A + M_A$; and means responsive to said voltage appearing at said summing node for indicating the moisture weight per unit area of said material passing said first station.

10. The apparatus of claim 9 further comprising means for varying the slope of the curve defining the relationship between the voltage appearing at the wiper contact of said third potentiometer and that portion of the voltage appearing at the summing node attributable to the voltage at the wiper contact of said third potentiometer to compensate for the non-linear relationship between the moisture weight per unit area and percent moisture.

11. The apparatus of claim 9 wherein said means for connecting the wiper contacts of said first, second and third potentiometers comprises first, second and third summing impedances, respectively, connected in series between respective ones of said wiper contacts and said summing node, and further comprising a plurality of compensating impedances, and means for selectively connecting a predetermined number of said compensating impedances in parallel with said third summing impedance to vary the rate of change of the voltage drop thereacross, said predetermined number of compensating impedances being dependent upon the average value of the basis weight of said material passing said second station.

12. The apparatus of claim 9 wherein said means for setting the voltage drop across said third potentiometer comprises a plurality of resistors; a corresponding plurality of switches and means for selectively closing said switches to connect a predetermined number of said resistors in parallel with said third potentiometer, said predetermined number of resistors being dependent upon the average value of the basis weight of said material passing said second station.